United States Patent [19]

Bowles et al.

[11] 4,203,071
[45] May 13, 1980

[54] PSEUDO-RANDOM-NUMBER-CODE-DETECTION AND TRACKING SYSTEM

[75] Inventors: William M. Bowles, Arlington; Duncan B. Cox, Jr., Beverly; Walter J. Guinon, Newburyport, all of Mass.

[73] Assignee: The Charles Stark Draper Laboratory, Inc., Cambridge, Mass.

[21] Appl. No.: 931,370

[22] Filed: Aug. 8, 1978

[51] Int. Cl.² .................. H04K 1/04; H03K 6/04
[52] U.S. Cl. .......................... 375/1; 329/178; 375/97; 375/102; 375/115
[58] Field of Search ............ 364/516, 572, 724, 728, 364/825; 179/15 AP, 15 BS, 1.5 S; 178/69.1; 325/321, 323, 325, 32; 340/146.1, 167 R; 328/133, 142, 155; 329/104, 178

[56] References Cited

U.S. PATENT DOCUMENTS 3,593,138  7/1971  Dunn et al. ................... 325/4
3,648,237  3/1972  Frey, Jr. et al. ............ 340/146.1 D
4,095,047  6/1978  von Pieverling et al. ....... 178/69.1

Primary Examiner—Benedict V. Safourek
Attorney, Agent, or Firm—Robert F. O'Connell

[57] ABSTRACT

A pseudo-random-number code detection and tracking system using a closed loop system wherein a detector having a non-linear response characteristic is responsive to a coded received signal and to a locally generated coded signal to produce an error signal. The error is used to control the characteristics of the local signal so as to cause the signals to become aligned. Means are further provided to dynamically control the non-linear response characteristics of the detector so that the coded received signal and coded local signal remain aligned over a controllable range of error signal levels. Thus, a relatively large range can be used during an acquisition operation and a relatively narrower range during the tracking operation.

14 Claims, 18 Drawing Figures

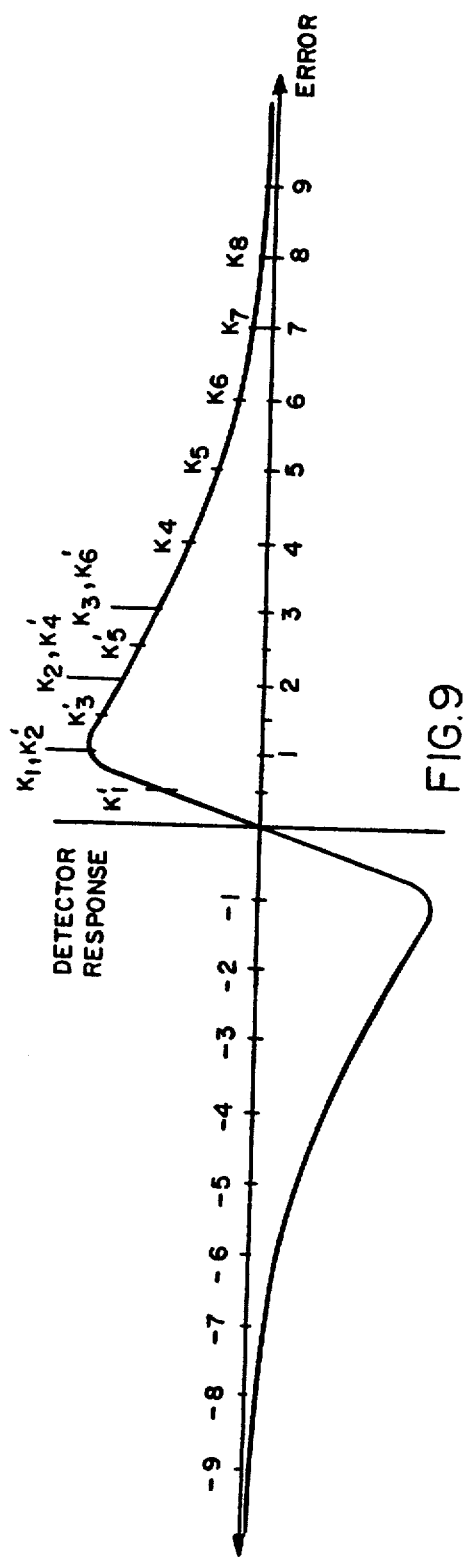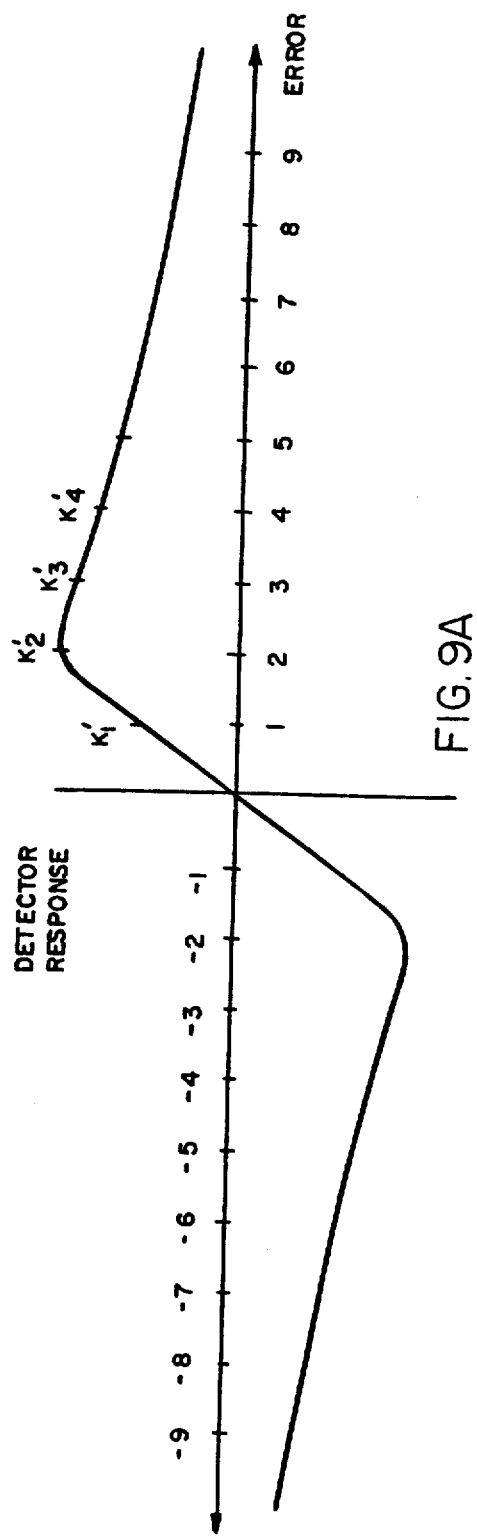

PSEUDO-RANDOM-NUMBER-CODE-DETECTION AND TRACKING SYSTEM

INTRODUCTION

This invention relates generally to tracking coded signals and, more particularly, to systems utilizing closed loops for providing acquisition and tracking of an incoming coded signal which may have pseudo-random-number characteristics.

BACKGROUND OF THE INVENTION

Many data handling systems, such as those used for communication or for navigation, utilize data based on binary-random-number codes. The receiver portions of such systems generally must perform two functions. First, the receiver must be capable of initially synchronizing a known coded signal generated at the receiver with the transmitted coded signal which is received, i.e., an acquisition function. Secondly, the receiver must continue to keep the two coded signals (i.e., the transmitted code and the locally generated code) aligned, i.e., a tracking function.

Often such functions are performed by effectively separate circuitry each of which handles the acquisition and tracking operations in a generally independent manner. Thus, acquisition is often handled by utilizing a matched filter or a sequential detection scheme, while the tracking function is handled by the use of a feedback loop which, for example, may utilize an early-late detector for developing an error signal.

For the acquisition operation the use of matched filters has an advantage in that the transmitted coded signal can be acquired relatively quickly even with relatively large initial errors between the locally generated code and the received code. The initial error is then reduced to a sufficiently low level in a relatively short time so that an early-late detector loop can then be utilized for the tracking operation. In the presence of high noise levels where the signal-to-noise ratios become relatively low, the ability of the matched filter to provide fast acquisition depends on the sophistication and complexity of the implementation thereof. The use of binary-random-number sequences in such systems aids in the noise rejection operation and relatively low power random-number sequences can be acquired even in the presence of a relatively noisy background. The matched filter hardware is often highly complex and the cost thereof may be prohibitive or at least highly undesirable in many applications.

Sequential detection circuitry which is used for acquisition operations is usually easier to implement but is much slower in its ability to acquire the incoming signal, particularly an incoming signal which is in the presence of relatively high noise and which moves in time. The ability of such a sequential detector to "lock-on" to the incoming signal depends generally on the product of the signal dynamics and the noise which is present. When such product reaches a certain level, the sequential detector normally will lose its capability for providing such lock-on operation.

Further, during the tracking mode, the use of an early-late detector tends to suffer from its inability to track the incoming coded signal once the error exceeds a certain level. In effect, the acquisition range of the known early-late tracking detectors is relatively narrow and, if the noise-dynamics product drives the error outside of such range while the detector is tracking, reacquisition of the data becomes impossible until the noise-dynamics product reduces to a point where the acquisition becomes possible.

In systems where only an open-loop, matched filter is utilized, the broad capture range thereof permits acquisition of the signal but such systems can not provide any tracking capability so that each time the coded signal is transmitted and received the matched filter must reacquire the signal.

In systems where only an early-late, closed-loop detection scheme is utilized, acquisition or re-acquisition takes a relatively long time if the initial error becomes too large since the loop, in effect, must be stepped along to find the signal (i.e., to reduce the initial error to a level at which the loop can lock-on thereto).

An example of a system which utilizes matched filtering techniques for acquiring a random-number coded incoming signal but which acts as an open loop, non-tracking system requiring reacquisition upon the transmission of each coded signal can be found in the text "Introduction to Radar Systems", M. I. Skolnik, McGraw-Hill Book Co., New York, 1962, page 412.

An example of a delay-locked loop system which can act to track a coded signal once it has been acquired is found, for example, in U.S. Pat. No. 4,092,601 (Lee and Cox), issued on May 30, 1978.

An example of a system which operates in two modes, (1) an acquisition mode using matched filter techniques and (2) a tracking mode using a closed loop operation, can be found in the text "Spread Spectrum Systems", R. C. Dixon, John Wiley and Sons, New York, 1976, page 194.

It is desirable to devise a system which will operate not only to acquire the desired incoming coded signal relatively rapidly but also to continue to track such coded signal after "lock-on" is achieved and which may require substantially less complex hardware for implementing the overall operation than is required for open-loop, matched filter operation. Such a system will retain the desired relatively fast acquisition characteristics and avoid the need for reacquisition during the tracking operation. Such system should provide a reliable operation and be capable of acquiring the incoming signal even with relatively large initial errors so as to provide effective operation in many applications at a reasonable cost.

BRIEF SUMMARY OF THE INVENTION

In accordance with the invention a system is provided for obtaining the above-described advantages, which system generally uses a non-linear detection technique for use in a closed-loop system, which detector has an extended "capture" range for acquiring the incoming signal even with a relatively large initial error. The system of the invention includes the capability of dynamically adjusting the extended range by dynamically varying the non-linear characteristics so that a relatively large extended range can be utilized during an initial acquisition operation, for example, and relatively narrower ranges can be utilized during the tracking operation. Whenever the system error increases during tracking, the non-linear characteristics of the system can be varied so as to broaden, or extend, the tracking range by a sufficient amount so that the error falls within the extended range capability and the signal can continue to be tracked.

BRIEF DESCRIPTION OF THE INVENTION

The invention can be described in more detail with the help of the accompanying drawings wherein:

FIGS. 9 and 9A show graphs of selected exemplary detector responses for the embodiment of FIG. 8;

Figure 1:
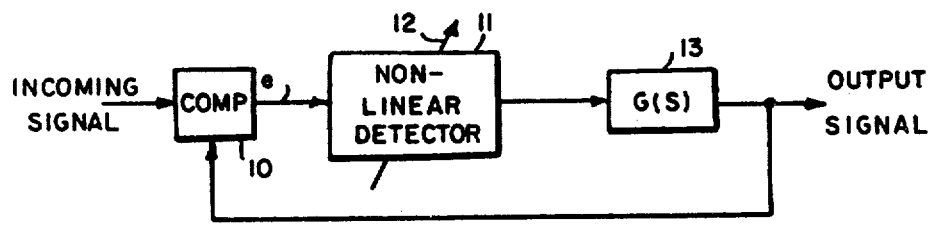
FIG. 1 shows a broad block diagram of a preferred embodiment of the invention.

FIG. 1 shows a broad block diagram of a closed loop system in accordance with the invention, which system can be used for acquiring and tracking an incoming pseudo-random-number coded signal. As can be seen therein, the incoming signal is compared with a locally generated pseudo-random-number coded signal at comparison circuitry 10 to generate an error signal, e, supplied to a non-linear detector 11 having dynamically variable non-linear characteristics indicated diagrammatically by arrow 12. The detector output is supplied to a suitable network 13 having a transfer function G(s), which network, for example, may comprise suitable filtering, a voltage control oscillator and code generator which produces the locally generated pseudo-random-number code signal. When the error is reduced essentially to zero, such locally generated signal corresponds to the incoming pseudo-random-number coded signal for use in subsequent processing.

Such a system may be utilized in various contexts as for coded signal receivers for use in communications or navigation applications. The incoming pseudo-random-number coded signal is transmitted by a suitable transmitter (not shown) and a conventional receiver (not shown) for receiving the transmitted signal and supplying it to the loop shown in FIG. 1 which in turn provides a signal which corresponds to the pseudo-random-number coded signal which is being received. For simplicity in FIG. 1, the characteristics of the filters, oscillator and pseudo-random-number coded generator are shown broadly as having an overall transfer function G(s).

Such a system can be compared, for example, to the code tracking loop described in U.S. Pat. No. 4,092,601 of Lee and Cox, mentioned above. In the Lee and Cox system, the non-linear characteristic of the detector 11 is fixed and is generally of the form shown in FIG. 2, which shows a graph of the detector response as a function of the error signal e. If the error signal is less than the maximum error which the detector can handle, indicated by $e_m$ and $-e_m$, the loop will lock-on to the incoming signal and track the signal so long as the error remains below such levels. The error must be reduced to a level within the non-linear response characteristics of the detector for such lock-on and tracking operations to occur. If the error is greater than $\pm e_m$ such operation cannot occur.

If the range of the error level to which the non-linear detector can respond is increased in accordance with the invention, however, the ability of the loop to acquire the incoming signal, even with relatively large initial errors, is enhanced and the loop will not lose its locked-on operation. One such extension of the range thereof is as shown, for example, in the graph of FIG. 3 where, as can be seen, the error range is extended to produce an operating range between $e'_m$ and $-e'_m$, the characteristics being substantially similar to that shown in FIG. 2 over the same range ($-e_m < e < e_m$) as shown in such latter figure, but such non-linear characteristics being substantially flat in the extended range, as shown.

Figure 2:
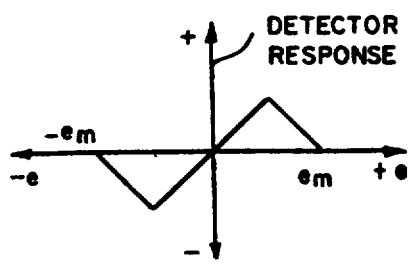
FIG. 2 shows a graph of the detector response of a prior art system.
Figure 3:
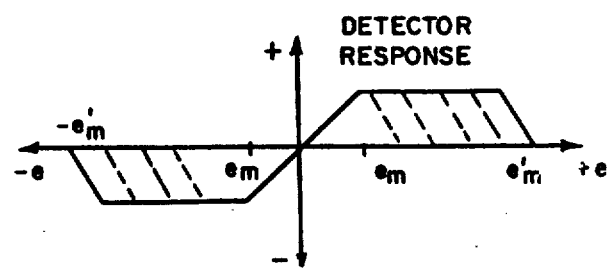
FIG. 3 shows a graph of the detector response of a particular embodiment of the invention.

If the characteristics of such a non-linear detector were devised in accordance with FIG. 3, for example, the system would be able to acquire incoming pseudo-random-number coded signals even though the initial errors are substantially large because of the extended range of the detector operation. Once the signal has been acquired and lock-on achieved, the range can be dynamically reduced, e.g., to a level such as in FIG. 2, and adequate tracking can occur until the error becomes large again, in which case the dynamic range can be again increased to that of FIG. 3 to reacquire the signal.

The shape of such extended range characteristics of the detector operation need not be that specifically shown in FIG. 3 since extended range configurations other than the flat characteristics shown therein may be more desirable in some applications. However, in order to illustrate a specific configuration of a system in accordance with the invention, a system will be described which provides for the flat non-linear characteristic shown in FIG. 3. Such an implementation of the invention is depicted, for example, in the block diagram of FIG. 4.

As can be seen therein, an incoming signal is identified as the signal $S_t$. Such signal, for example, may be a pseudo-random-number coded signal which, as is known, is a piecewise constant waveform. The sequence of constants which make up the code is a pseudo-random-number sequence. Transitions from one constant value to the next occur at a fixed frequency, the period of such transitions usually being referred to as one "chip". Of particular interest in many applications is the binary pseudo-random-number code which consists of a pseudo-randomly generated sequence of numbers having a value of $+1$ or $-1$. A pseudo-random-number code is one which is derived from a sequence which can be generated systematically but which has some of the properties of a random-number sequence. Pseudo-random codes are well known and are of practical interest since a receiver which is capable of generating the pseudo-random-number code sequence can lock onto a pseudo-random-number code signal which looks to other receivers like noise. At the same time spurious signals which may accompany the incoming pseudo-random-number code signal (as, for example, spurious signals generated by thermal noise or external jamming signals) will appear as noise to the receiver which locally generates a pseudo-random-number code and may be rejected by proper filtering techniques. Shift registers, for example, have been proven to be very useful in generating pseudo-random-number codes.

In the code tracking system which utilizes a digital delay locked loop approach as described in the aforementioned Cox and Lee patent, the system has a non-linear detector characteristic of the type shown in FIG. 2. As explained in such patent, the detector is responsive both to an input code signal and to a locally generated code signal. The latter signal, for example, can be in the form of a pair of time shifted, estimated coded feedback signals which represent an estimate of the coded input signal which has been advanced and delayed, respectively, by a specified time shift. An effective error signal is formed from the time shift comparison of the incoming signal and the estimated signal and the error signal is supplied to a digital integration means, such as an up-down counter, to generate a pair of control signals. The control signals control the pulse rate of a pulse clock signal in accordance with a time shift error between the estimated code signal and the input code signal. The controlled pulse rate signal is then used to generate the estimated advanced and delayed feedback coded signals for minimizing the error so as to produce a coded signal which is, in effect, locked into time synchronism with the input coded signal. The ability for such digital delay-locked loop system to lock into the incoming coded signal is limited because the locking range is substantially limited, as shown in FIG. 2.

Figure 4:
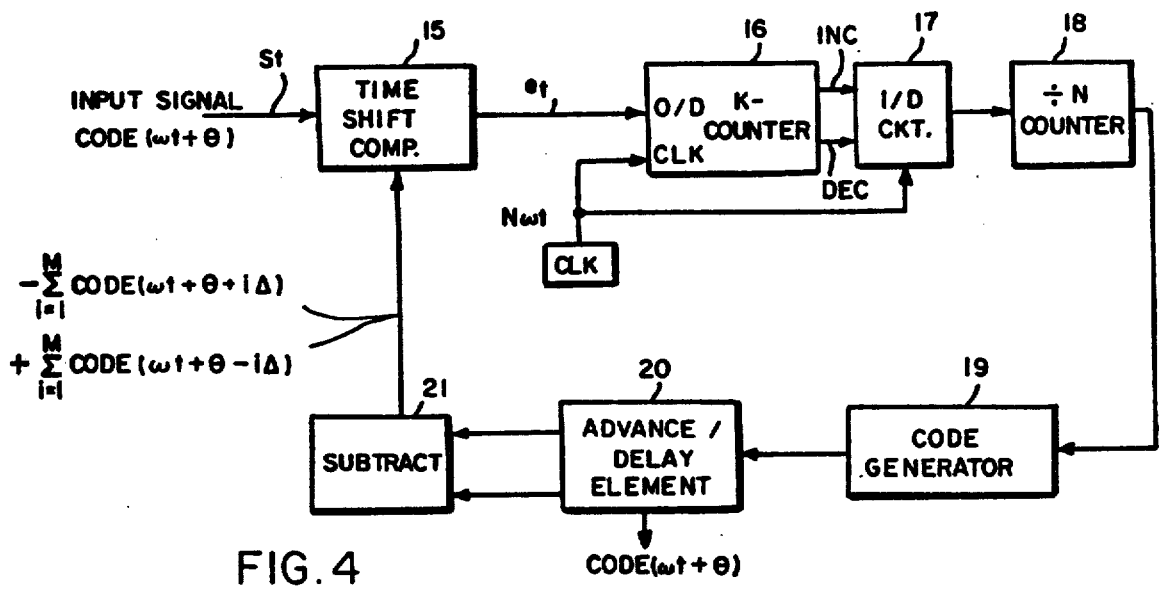
FIG. 4 shows a block diagram of an embodiment of the invention.
Figure 4A:
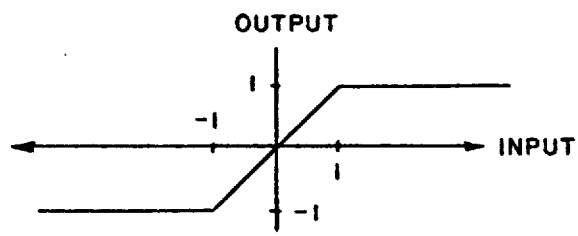
FIG. 4A shows a graph of the response of a limiter which can be used in connection with the embodiment shown in FIG. 4.

FIG. 4 depicts a modification of such system which provides an extended tracking range which permits the loop to lock into an incoming signal with relatively large initial errors. As can be seen in FIG. 4, an input signal identified as $S_t$ is supplied to a suitable comparison element 15 to produce a pulse width-pulse height modulated error signal identified as $e_t$ which is supplied to an up-down K-counter device 16 of the type discussed in the Lee and Cox system. In contrast with the Lee and Cox system, the input to the K-counter device 16 can take on $2n+1$ values ($-n, -n+1, \ldots, 0, \ldots, n-1, n$), where n indicates the amount of range extension. That is, the detector response is flat for errors of magnitude 1 through n and of magnitude $-n$ through $-1$. The Lee and Cox system K-counter has only three possible input values, corresponding to $n=1$. The operation of the system of FIG. 4 can be handled in one of two ways. One way is to limit the error input magnitude, that is, to pass the error through a non-linear device, such as a limiter, whose response is as shown in FIG. 4A. A second method is to change the clocking rate of the K-counter in addition to limiting the output of the time shift comparator signal. The clocking rate $|e_t|N\omega t$ is used instead of $N\omega t$ as shown. When the comparator signal only takes values $-1, 0, 1$ this system is also identical with the Lee and Cox system. The K-counter in the Lee and Cox device is suitably clocked by a clocking signal identified as $N\omega t$ which is at a higher frequency than the frequency $\omega t$ of the incoming coded signal. The output of the K-counter 16 is supplied to an increment/decrement (I/D) circuit 17 of the type described in the above-referenced Lee and Cox application. As discussed therein, a negative error signal decreases the clocking rate of the code generator device 19 relative to the clock (labelled CLK) and a positive error increases it. This is accomplished in the increment/decrement circuit 17 which is supplied with a clock signal having the same frequency as that supplied to counter 16. When an increment signal is supplied thereto, an additional clock pulse is added to the clock signal and when a decrement signal is supplied thereto a pulse is deleted from the clock signal. In the absence of either an increment or decrement signal (i.e., an effective zero error situation) the signal output from I/D circuit 17 is the same as the clock signal input thereto.

The output from I/D circuit 17 is supplied to a "divide by N" counter 18 which is thereupon supplied to a code generator circuit 19 in substantially the same manner as discussed in the previous Lee and Cox application. The output of the code generator circuit is supplied to advance/delay element 20 which provides a plurality of signals which are delayed by specified amounts and a plurality of signals advanced by specified amounts. The sum of the advanced signal components are identified as $$\sum_{i=1}^{m} \text{code}(\omega t + \theta + i\Delta).$$

The sum of the delayed signal components are indicated as $$\sum_{i=1}^{m} \text{code}(\omega t + \theta - i\Delta).$$

Figure 5:
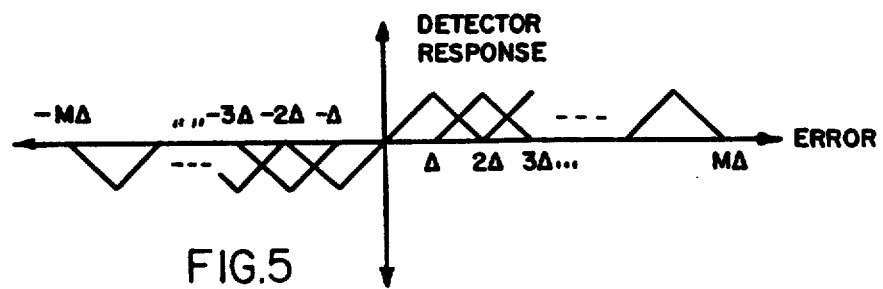
FIG. 5 shows a graph of the advanced and delayed signal components produced in the embodiment of FIG. 4.

The difference between these sums is appropriately determined by subtraction circuit 21 and supplied as a feedback signal to time shaft comparator 15 for comparison with the input signal. If no weighting is provided for each delayed or advanced signal component, the detector response is constant. This case is depicted in FIG. 5. Such operation provides the flat response characteristic of the detector as shown in FIG. 3.

Figure 6:
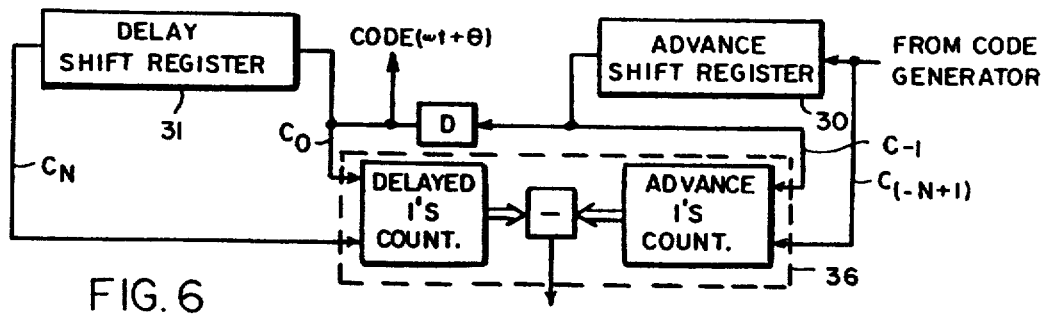
FIG. 6 shows a more detailed block diagram of a portion of the embodiment of FIG. 4.

FIG. 6 depicts diagrammatically the advance/delay element of FIG. 4 as comprising an "advance" shift register 30 and a "delay" shift register 31. In practice, the overall element may be a single shift register having an odd number of bits, the central bit represented by block "D" effectively representing the undelayed code generated bit (i.e., the signal code $(\omega t + \theta)$. The bits to the right thereof represent advanced shift register bits identified as bits $C_{-1}$ to $C_{(-N+1)}$ and the bits to the left thereof represent delay shift register bits (identified by bits $C_0$ to $C_N$). The bit outputs are subtracted to produce the desired difference signal.

The term N, i.e., the number of bits in each of the advanced and delayed shift registers, determines the width of the range extension. The term $e'_m$ indicated in FIG. 3 is equal to N and may be varied by effectively changing the length of the advance and delay shift registers. The flat response is obtained by adding together all the signal components as indicated in FIG. 5. This is accomplished, for example, by initializing all the shift registers to all zeros then starting the code generator. From that point forward it is only necessary to keep track of one's entering and one's leaving each of the advance and delay shift registers. This operation is indicated in FIG. 6 where the input and output of the delay shift register, for example, are fed to appropriate logic circuitry labelled "Delayed 1's Count". The delayed 1's count circuit simply initializes at zero when the shift registers are set to zero and from that point forward increments by one when a one goes into the delay shift register and decrements by one when a one comes out of the delay shift register. The delayed 1's count circuitry thereby keeps track of the number of 1's present in the delay shift register. The advance shift register and advanced 1's counter circuitry operate in a similar manner. This technique provides an extended detector response while not requiring parallel access to all of the bits of the advanced shift register simultaneously.

Figure 6A:
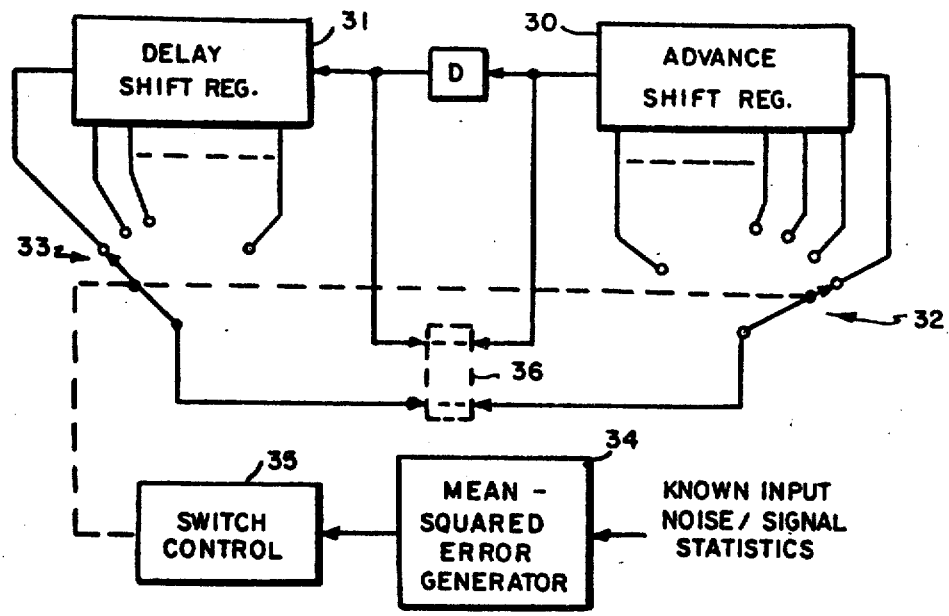
FIG. 6A shows modification of the portion shown in FIG. 6.

In the particular configuration as shown in FIG. 6 all of the bits in both the advance and delay registers are utilized and the register outputs have the maximum number of advanced and delayed signal components, representing the maximum extended range of operation available from such configuration. The tracking range can be reduced by utilizing fewer bits in each register (providing fewer signal components) and the selection of a particular desired range depends on the selection of the number of bits so used. The tracking range can be dynamically varied as shown in FIG. 6A, wherein appropriate switching elements 32 and 33 are utilized to select the bit lengths of the registers 30 and 31 which are to be used. In the same manner as shown in FIG. 6, the outputs from the switching elements of FIG. 6A are supplied to advanced and delayed 1's counters, such latter elements being within the dashed line block 36 of FIG. 6A and corresponding to components depicted within the dashed line block of FIG. 6. The position of the movable arm of each switching element can be controlled in any appropriate manner within the skill of the art. For example, since the errors cannot be known exactly but only statistically, the control of the detector tracking range capability can be arranged to depend upon the statistical characteristics of the errors involved, e.g., in accordance with the mean-squared value of the error. The statistical characteristics of the errors can be determined from the statistical characteristics of the noise/signal properties of the input signal, which properties are known. Accordingly, using statistical techniques readily available to the art, the range can be dynamically varied in accordance with changes in the statistically determined mean-squared error value to assure that the system will retain its tracking capabilities with a sufficient degree of reliability as required by the user in any particular application.

Thus, as indicated in FIG. 6A, the known noise/signal statistical characteristics of the input signal are utilized to determine the loop mean-squared error (i.e., the average squared error level) in accordance with well known computation techniques by the use of mean-squared error generator 34, for example. Such mean-squared error is then used to control the position of switches 32 and 33, via suitable switch control circuitry 35 for determining the desired detector range, i.e., the desired register bit lengths which should be used. For example, the switch position can change in accordance with changes in level of the mean-squared error. Thus, as the mean-squared error varies the selected range varies, as exemplarily shown by the dashed lines in FIG. 3, so that the system maintains its tracking capability in the most effective manner. So long as the total lengths of the shift registers are sufficient, the system can track incoming signals having relatively large statistical errors. The system can also then track smaller errors relatively rapidly (e.g. errors small enough to permit operation at the linear portion of the response) once the extended range operation reduces the statistical error to sufficiently low values.

The above embodiments utilize a detector response generally of the form indicated in FIG. 3 wherein the range of response of the non-linear detector is extended in a substantially flat manner.

Figure 7:
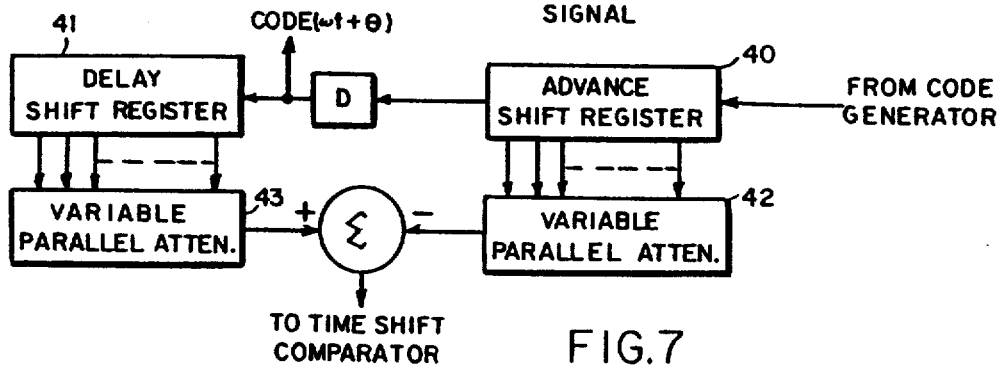
FIG. 7 shows another modification of a portion of the embodiment of FIG. 4.

In accordance with the invention, it is also possible to vary the form of the detector response by appropriate weighting of the feedback signal components in a manner such that the shape of the response curve is relatively arbitrarily designated thereby as desired for particular system applications. One such approach is shown by the embodiment of FIG. 7, for example, wherein the output components of the advance and delay shift registers of FIG. 6 are taken in parallel, rather than serially as in FIG. 6, and each of the parallel outputs is appropriately weighted by providing selected attenuations thereof. The shift registers comparable to those of FIG. 6, are shown as shift registers 40 and 41, and the parallel outputs from each are supplied to variable parallel attenuation devices 42 and 43 respectively. Thus, each parallel bit is selectively weighted depending on the attenuations provided. Such devices may be photo-resistor devices, that is, conductive substrates having layers of photoresistor material on a surface thereof to which the parallel bits are supplied, the resistance of the photoresistive layer providing an attenuation of the signals applied thereto. The resistance of photoresistor material can be varied by varying the intensity of a light beam applied thereto, different intensities of light being applied along the device so that the attenuations of the parallel bits applied therealong vary accordingly. The bits are removed from units 42 and 43 serially and subtracted, as shown, to produce the desired difference signal.

Figure 7A:
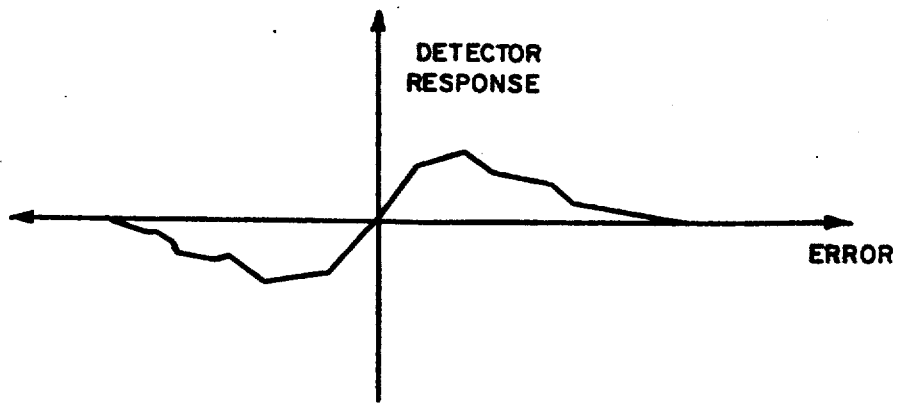
FIG. 7A shows an arbitrary detector response of the detector of the embodiment using the modification of FIG. 7.

By selecting the bit weights as desired, an arbitrary shape for the detector response can be obtained as shown in FIG. 7A wherein the straight-line segments making up the overall detector response are determined, for example, by the weights which have been introduced by the variable parallel attenuations discussed in FIG. 7. Although the particular arbitrary wave shape shown does not necessarily have practical significance, it does illustrate the concept that many arbitrary detector responses can be selected in accordance with the invention.

Figure 8:
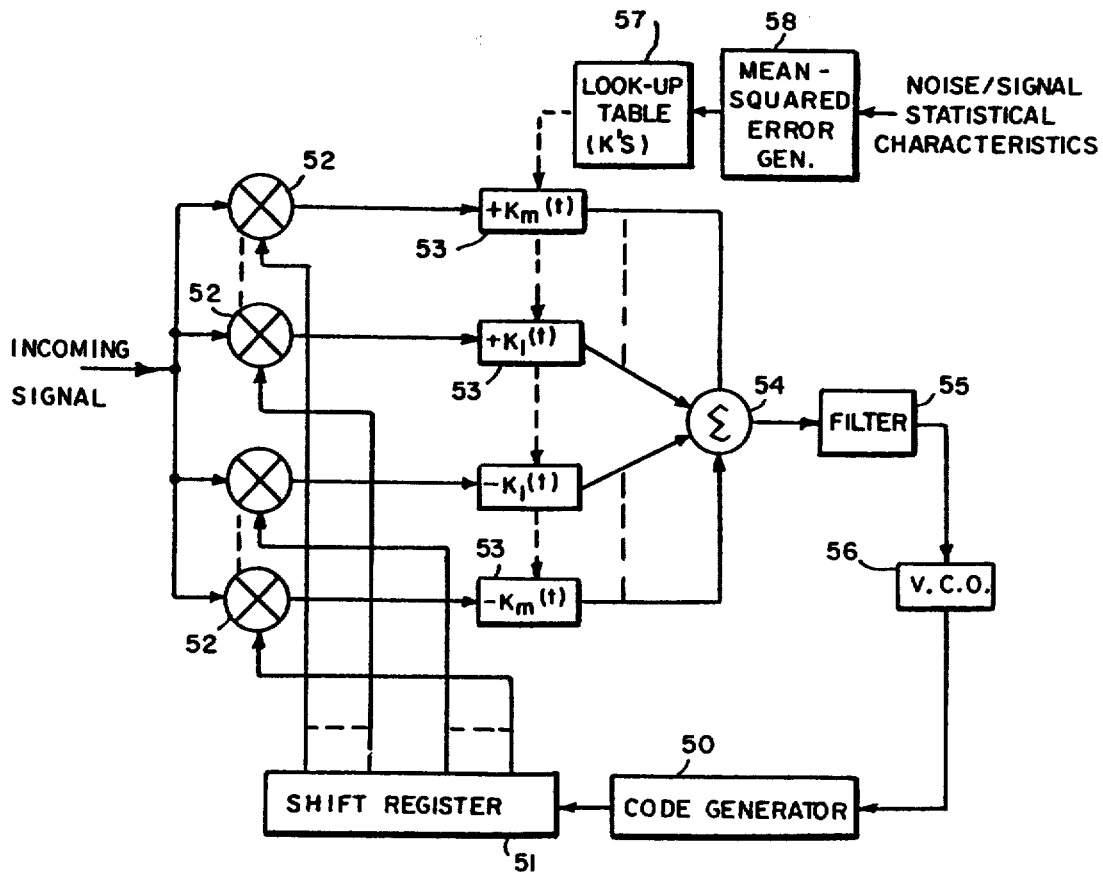
FIG. 8 shows another embodiment of the system of the invention.

Another embodiment of the invention which utilizes a technique for providing variably weighted signals for substantially the same purpose is shown in FIG. 8. As can be seen therein, such weighting factors can be introduced following the time shift comparison process (i.e., following the correlation of the locally generated code signal and the incoming code signal), such weighting being, in effect, a part of the non-linear detection operation. The feedback signal from the code generator 50 is supplied to a shift register 51, which as discussed above provides advanced and delayed feedback signal components, of which are supplied to the inputs of a plurality of multipliers (correlators) 52 which are each also supplied with the incoming coded signal so that the time shift comparison occurs on a parallel basis, as depicted. The outputs of the multipliers 52 are then supplied to attenuator circuits 53 which provide weighted attenuations thereof in accordance with selected weight factors, or attenuations, indicated as $K_1(t)$, $K_2(t)$, ... $K_m(t)$. As discussed below, the attenuations can in the general case be functions of time or they may be constants depending on the application and the desired detector response. The outputs of the attenuators are supplied to a summing circuit 54 which provides the desired non-linear detector response for supply to the loop components, e.g., the loop filter 55, voltage control oscillator 56 and code generator 50 as depicted and discussed above with reference to previously described embodiments.

The selection of the weight factors can provide appropriate shapes for the non-linear detector characteristics. Thus, if the weights are substantially equal, an effectively flat detector characteristic of the type discussed with reference to FIG. 3 can be obtained. Theoretically, the weights may be adjusted to approximate any arbitrary detector response characteristic as also discussed above with reference to FIG. 7A. For particular applications, however, certain responses may prove to be more preferable than others for such purpose.

One general response which appears to be effective is of the type shown in FIG. 9. The function drawn in FIG. 9 can be denoted by f(x). The range of the detector can then be parameterized by a parameter $\delta$ where the weights $K_i$ are chosen to be $K_i = f(i \cdot \delta)$. One set of weights, for example, would be $K_1 = f(1)$; $K_2 = f(2)$; $K_3 = f(3)$; etc., corresponding to $\delta = 1$. These weights are depicted in FIG. 9. Another set of weights which would correspond to an extended range would be $K_1' = f(\frac{1}{2})$; $K_2' = f(1)$; $K_3' = f(3/2)$, etc. The $K_i'$ weights correspond to choosing $\delta = \frac{1}{2}$. The curve in FIG. 9 is the response which is obtained using the weights $K_i$. If the response obtained using the weights $K_i'$ is plotted on the same scale as in FIG. 9, the curve in FIG. 9A is obtained. Choosing $\delta < 1$ corresponds to stretching the response curve or broadening the detector range. There is a practical limitation to this, of course, since there are only a finite number of weights. The detector response always cuts off at the same value. The range may be extended even further as shown, for example, by the dashed line response curve of FIG. 9A.

Thus, different sets of weighs $K_i$, can be utilized at different times depending on the detector range that is required. Accordingly, during an acquisition mode, for example, the range should be relatively large because of substantially large errors and will utilize one set of weights, while during a subsequent tracking mode the range can be reduced considerably by using another set of weights. In effect, the selection of different sets of weights stretches or contracts the detector response characteristics as exemplarily shown in FIGS. 9 and 9A. The curve shown in FIG. 9 can be stored in a standard look-up table 57. The proper weights can then be determined, after the desired stretch is determined, by simply looking up the appropriate value on the curve.

The criteria for selecting the desired response curve will depend on the application to which the system is being put. One such selection may be based on the determination of the mean-squared value of the error as based upon the statistical characteristics of the input noise/signal, as discussed above with reference to FIG. 6A and as shown by mean-squared error generator 58. Techniques for determining the mean-squared error values from input noise/signal statistics are well-known to those in the art.

Figure 10:
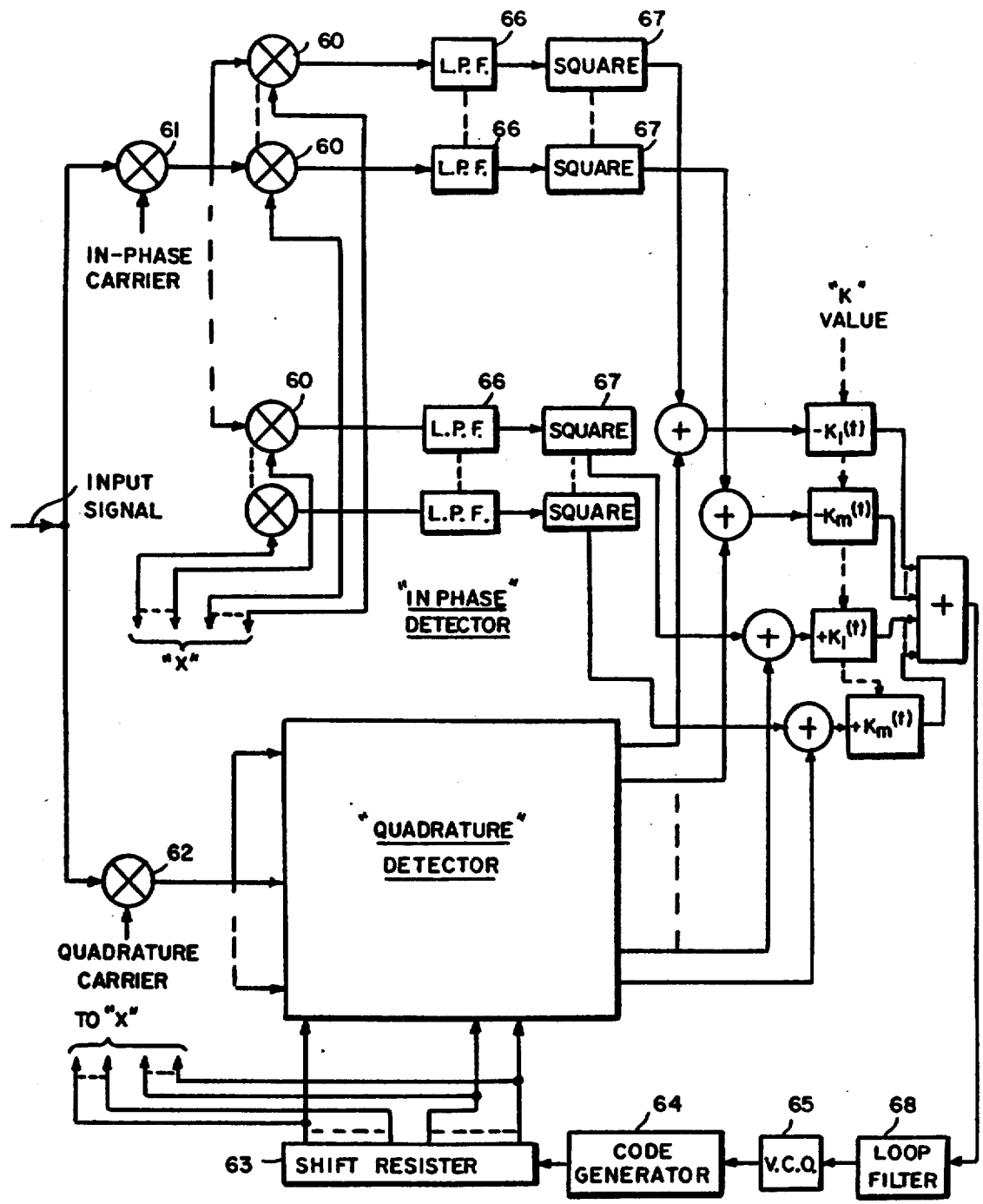
FIG. 10 shows still another embodiment of the system of the invention.

As is also well known in the art, for code tracking systems wherein the code signal modulates a carrier signal, a system in which the phase of the carrier signal is known (e.g. a standard carrier tracking loop can be utilized for such purpose) can be referred to as a "coherent" system. On the other hand, if the phase of the carrier signal is not known, e.g., the system does not use a carrier tracking loop or the system uses such a loop but the loop fails to track the carrier signal, such system can be referred to as a "non-coherent" system. The embodiment of FIG. 8 will perform as intended for a coherent system, while for a non-coherent system as alternative embodiment must be utilized to provide adequate performance. Such an alternative system is shown in FIG. 10, in which both an in-phase and a quadrature detector are required, the outputs thereof being appropriately combined before the weighting factors are introduced. Each of the detectors has substantially the same configuration, which is generally similar to that of FIG. 8. In FIG. 10, the in-phase component of the input signal is supplied to an in-phase detector comprising multipliers 60 in accordance with the operation of which the in-phase input is correlated with the locally generated signal. Similarly the quadrature component of the input signal is correlated with the locally generated signal at similar multipliers in a quadrature detector. The in-phase and carrier components of the input signal may be obtained, for example, by generating a local carrier signal of the same frequency as the input carrier signal and supplying it to multiplier 61 and by delaying the local carrier signal by 90° before supplying it to multiplier 62.

The outputs of shift register 63 are supplied to in-phase multipliers 60 and corresponding quadrature multiplier (not shown) which are also each supplied with the outputs of multipliers 61 and 62, respectively. In the in-phase detector the outputs of multipliers 60 are suitably filtered by low pass filters 66, the filtered outputs being squared by squaring circuits 67 before being added to corresponding outputs from the quadrature detector. Following the summation of the in-phase and quadrature detector output signals, the weighting factors are inserted as shown by $K_1(t)$, $K_2(t)$ ... $K_m(t)$ the weighted outputs in turn being summed for supply to the loop filter 68, V.C.O. 65, and code generator 64 in the same manner as in FIG. 8.

Figure 11A:
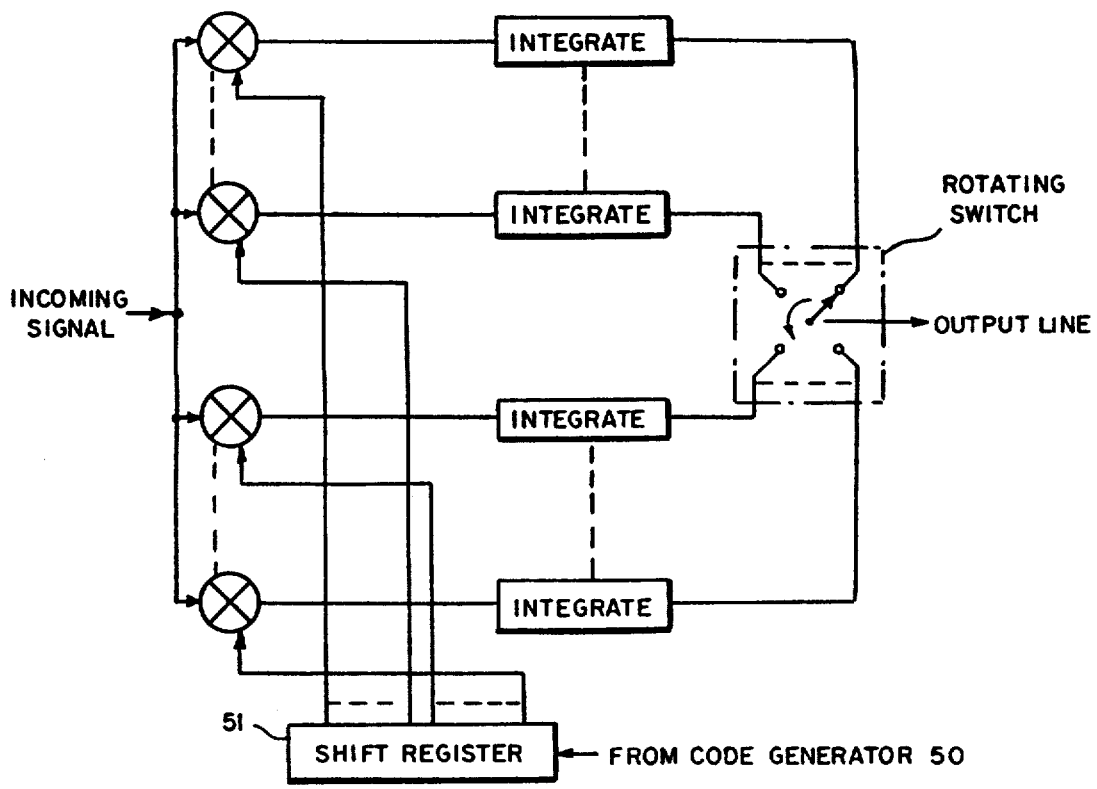
FIG. 11A shows a block diagram showing the operation of the matched filter as related to the operation of a portion of the embodiment shown in FIG. 8.
Figure 11:
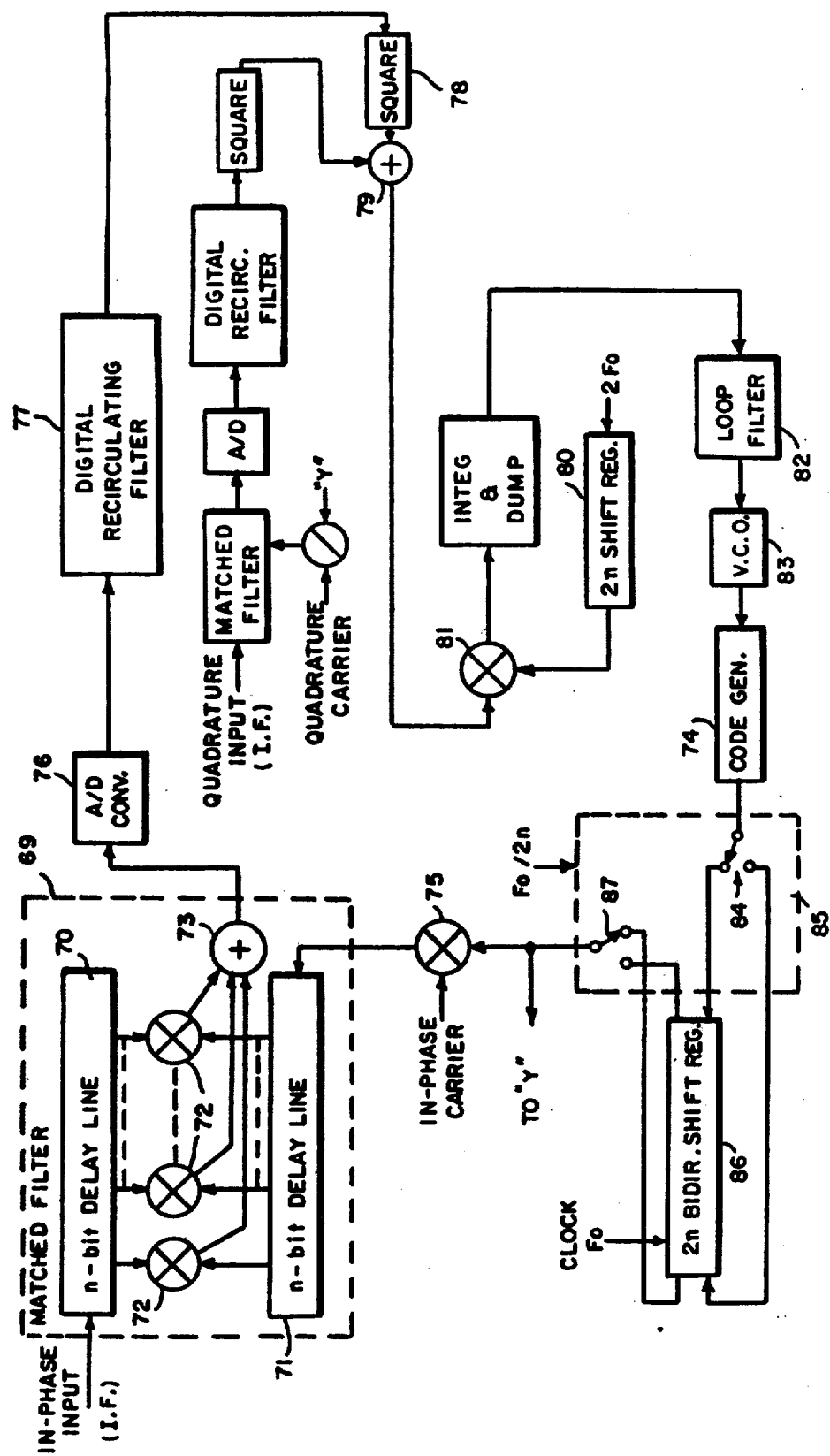
FIG. 11 shows still another embodiment of the system of the invention.

While matched filters have been suggested for use in open loop code acquisition and tracking systems their use in a closed loop tracking system of the type discussed here has up to now not been considered. However, a code tracking system using matched filter techniques can be used in accordance with the invention as shown in FIG. 11 wherein appropriate weighting factors are included in order to extend the tracking range for large error differences between the locally generated code and the incoming signal code. As can be seen therein, the matched filter 69 comprises a pair of delay lines 70 and 71, corresponding parallel outputs of which are separately correlated by multipliers 72. The correlated outputs are appropriately summed to provide a matched filter output signal at summation circuit 73. The input to a first delay line 70 is the code modulated incoming signal which is to be tracked while the input to the second delay line 71 is a code modulated local signal, i.e., a carrier signal, which is modulated by the local code generated by the code generator 74 of the loop (i.e., of the type generated in the systems discussed above with respect to previous embodiments). The locally generated code modulates an in-phase component of the carrier signal at multiplier 75. The modulated output of multiplier 75 is supplied to second delay line 71 of the matched filter. The correlated output between the code modulated incoming signal and the in-phase code modulated local signal, as obtained from the matched filter 69 is generally of an analog form and is converted to digitized form by a suitable analog-to-digital converter circuit 76. The matched filter can be visualized as converting the parallel signals from the multipliers 52 in FIG. 8 to a sequential format. FIG. 11A shows how the operation of the matched filter is related to the operation of the parallel multipliers 52 from FIG. 8. If the multiplier outputs are integrated and the integrated outputs are sampled and reset by a rotating switch, which switches from one position to the next at two times the code clock rate, then the integrated sampled signals can be placed sequentially on a single output line. Such line would have a signal on it which corresponds to the signal on the line out of the matched filter block 69 in FIG. 11. The digitized correlation output is supplied to a digital recirculating filter 77 which, in effect, provides a recirculating integration thereof. Such a recirculating filter is discussed, for example, in the above mentioned Skolnik text at page 446.

The recirculating integration signal is then squared through appropriate squaring circuitry 78. Before the signal is weighted for supply to the loop it is appropriately summed with a similar signal generated with respect to the quadrature modulated component of the local code signal, that is, the locally generated code is used to modulate the carrier component shifted by 90° with respect to the in-phase component discussed above. Such modulated signal is supplied to a matched filter to which the incoming code modulated signal is also supplied. Such matched filter is of the same configuration as matched filter 69. As in the case of the in-phase signal, the quadrature signal is also appropriately digitized, supplied to a digital recirculating filter, and squared for summation with the signal from squaring circuit 78. The sum of the in-phase and quadrature components at summation circuit 79 in serial form is then suitably multiplied in multiplier 81 by weighting factors serially supplied from a shift register 80, which is loaded with the required weighting factors to produce the detector response shape which is desired. The weighted output from multiplier 81 is appropriately integrated and supplied to the loop filter 82 and voltage controlled oscillator 83 to produce the locally generated code via code generator 74, as discussed above.

In feeding back the locally generated code signal for modulating the in-phase and quadrature components of the carrier signal, the locally generated code signal can be appropriately supplied through switching circuitry 85 to an input of a bi-directional shift register 86 suitably clocked by clock signal Fo. When the coded signal has been fully loaded into the shift register (from either end depending on the status of switch element 84), the loaded code signal is thereupon removed from the same end by appropriately switching of the switch element 87 of switch circuit 85 so that the signal is retrieved from shift register 86 in an inverted direction when supplied to the modulating system. By the use of switching circuit 85 the most effective use of the bi-directional shift register 86 can be made by loading a coded feedback signal at one end, retrieving such loaded signal from the same end, while simultaneously loading the next coded feedback signal at the opposite end, the retrieval of one signal and the loading of the next occurring simultaneously at opposite ends of the shift register, the operations of switch elements 84 and 87 being appropriately synchronized at a speed Fo/2n.

Figure 12:
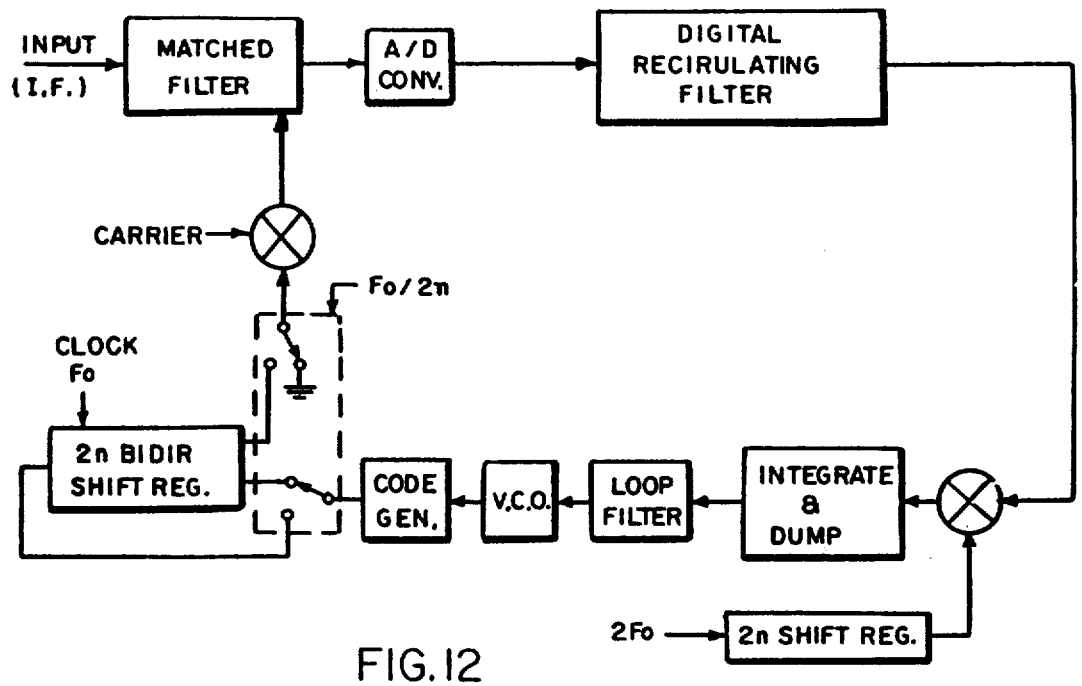
FIG. 12 shows still another embodiment of the system of the invention.

While the matched filter-loop technique of FIG. 11 has been described for non-coherent operation (as defined above) such technique can also be used in a more simplified form, as shown in FIG. 12, for coherent operation. Since the phase of the incoming carrier is known in such operation, only a single modulation of the known carrier is required. The output of the digital recirculating filter can then be directly multiplied by the selected weighting factors, as shown.

Figure 13:
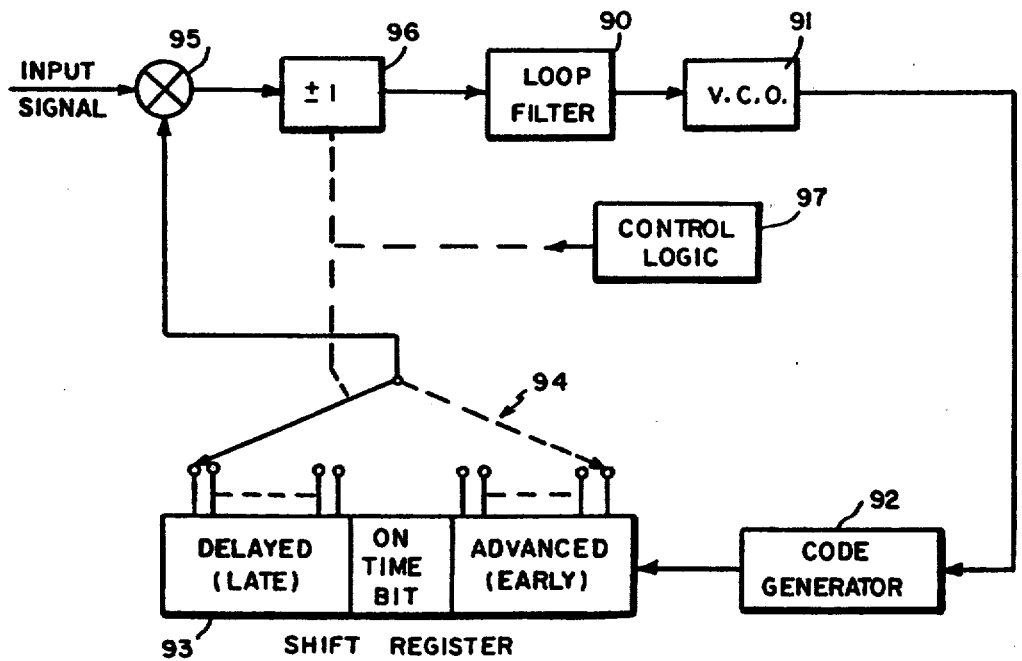
FIG. 13 shows still another embodiment of the system of the invention.

An additional embodiment of the invention is shown in FIG. 13 in which the implementation thereof is simplified while the effect of providing a desired shaping of the detector response is maintained. The figure shows a loop of the type discussed above including a suitable loop filter 90, voltage controlled oscillator 91, and code generator 92. The code generator produces a locally generated code signal, as also discussed above, which signal is serially supplied to an advance/delay, or early/late, shift register 93, also of the type discussed above. A switch element 94 permits a contact to be made at any one time to any of the parallel bits of the shift register which is thereupon supplied to a time shift comparator 95 for comparison with the input signal, as shown. The bits from shift register 93 are, thus, supplied in a selected sequential manner to the comparator 95.

As in the previously discussed embodiments the advanced bits and delayed bits are subtracted in FIG. 3 (in FIG. 4 such operation is performd by subtraction circuit 21) so that the difference therebetween is obtained. Such operation is effectively performed by multiplier 96 which multiplies the detector response either by +1 (for the delayed bits) or by −1 (for the advanced bits). Accordingly, the operation of switch 94 and multiplier 96 is coordinated by suitable control logic 97 to provide multiplication by +1 when a bit in the sequential selection process is selected from the advanced bit portion of register 93 and by −1 when a bit is selected from the delayed portion of register 93.

The number of bits selected from each portion of the register determines the detection range of the system. Thus, a minimum range occurs if only those advanced and delayed bits immediately adjacent the "on-time bit" are selected. Such range can be extended to a maximum by selecting all of the advanced and delayed bits in an appropriate sequence. Intermediate ranges can be obtained as desired by selecting an intermediate number of advanced and delayed bits in a sequence.

The order of the sequential selection of bits is not critical so long as each of the bits is selected once during each sequential cycle thereof. One exemplary sequence may involve, for example, the sequential selection of all of the bits from the most delayed bit (the position of the switch shown in FIG. 13) to the most advanced bit (the position of the switch shown by the dashed line in FIG. 13), the detected response being multiplied by +1 during the sequential selection of delayed bits and by −1 during the sequential selection of advanced bits.

If the bits are sequentially selected at a constant rate (i.e., switch 94 moves uniformly and remains at each selected position for the same time duration) the detected response will be, in effect, constantly weighted, i.e., a substantially flat response such as shown in FIG. 3. Variable weighting can be achieved by utilizing a non-uniform switching motion wherein the amount of time at each selected bit position varies in a predetermined manner. Such variable switch times provides a desired weighting of the detected response, which weighting can be predetermined for the application in which the system is to be used, as discussed above with reference to the "weighted" responses depicted in FIGS. 7A, 9 and 9A, for example.

While the system of FIG. 13 may tend to have less performance capability, because of larger errors which tend to arise due to the sequential detection operation as opposed to the substantially simultaneous detection operation of FIG. 8, for example, the simplification and savings in hardware complexity and costs can be justified in many applications.

We claim:

1. A pseudo-random-number code detection and tracking system comprising
   means for receiving a transmitted coded signal;
   means for generating a local coded feedback signal;
   detector means having non-linear response characteristics responsive to said coded received signal and to said local coded signal and including means for comparing said received and local signals to produce an error signal when said received and local signals are not aligned;
   means responsive to said error signal for controlling the operation of said local coded feedback signal generating means to vary the characteristics of said local coded feedback signal so as to cause said signals to become aligned and, thereby, to minimize said error signal;
   control means, responsive to the statistical characteristics of said error signal, capable of dynamically changing the non-linear response characteristics of said detector means so that said response is substantially linear over a firt selected range of the error signal levels and is substantially constant over a second selected range of error signal levels, whereby said local coded signal and said received coded signal remain substantially aligned over a controllable range of error signal levels; and wherein said control means includes means for dynamically varying said second selected range.

2. A system in accordance with claim 1 wherein said means responsive to said error signal for controlling the operation of said local coded feedback signal includes
   digital means responsive to said error signal for controlling said local coded feedback signal.

3. A system in accordance with 2 wherein said digital means includes
   means for limiting said error signal; and
   up-down counter means responsive to said limited error signal.

4. A system in accordance with claim 2 wherein said digital means includes
   means for limiting said error signal; and
   variable rate up-down counter means.

5. A system in accordance with claim 1 where said detector means includes
   shift register means for time shifting said coded feedback signal to provide a first plurality of time-shifted coded feedback signal components advanced in time and a second plurality of time-shifted coded feedback signal components delayed in time; and
   means for combining said first and second plurality of coded feedback signal components to produce a time-shifted coded feedback signal for comparison with said received signal to produce said error signal.

6. A system in accordance with claim 5 wherein said means for combining said first and second plurality of coded feedback signals includes
   means for counting the number of one's that are input and the number of one's that are output from said advanced and said delayed shift register means.

7. A pseudo-random-number code detection and tracking system comprising
   means for receiving a transmitted coded signal;
   means for generating a local coded feedback signal;
   detector means having non-linear response characteristics responsive to said coded received signal and to said local coded signal, said detector means including
   shift register means for time shifting said coded feedback signal to provide a first plurality of time-shifted coded feedback signal components advanced in time and a second plurality of timeshifted coded feedback signal components delayed in time;
   means responsive to said first and second plurality of time-shifted signals components for providing dynamically selective attenuations thereof; and
   means for combining said selectively attenuated time-shifted signal components to produce said time-shifted coded feedback signals.

8. A system in accordance with claim 7 wherein said selective attenuating means includes photoresistor attenuating means responsive to each said first and second plurality of timeshifted signal components, the resistance of said photoresistor attenuating means being capable of selective control to provide different attenuations of each of said time-shifted signal components.

9. A pseudo-random-number code detection and tracking system comprising
   means for receiving a transmitted coded signal;
   means for generating a local coded feedback signal;
   detector means having non-linear response characteristics responsive to said coded received signal and to said local coded signal, said detector means including
   shift register means for time shifting said coded feedback signal to provide a first plurality of time-shifted coded feedback signal components advanced in time and a second plurality of time-shifted coded feedback signal components delayed in time;
   means for comparing each of said time-shifted signal components with said received signal to produce a plurality of comparison signal components;
   means for dynamically controlling the non-linear response characteristics of said detector means including means for controlling the level of each of said comparison signal components in accordance with a selected non-linear response characteristic of said detector means; and
   means for combining selectively controlled comparison signal components.

10. A system in accordance with claim 9 wherein said signal level controlling means includes
    means for selecting the levels of each of said comparison signal components in accordance with the noise/signal statistical characteristics of said reduced coded signal.

11. A system in accordance with claim 10 wherein said selecting means selects said comparison signal levels in accordance with the mean-squared error determined by said noise/signal statistical characteristics.

12. A system in accordance with claim 9 wherein said comparing means compares each of said time-shifted signal components with both a first received signal component having the in-phase carrier component and a second received signal component having a quadrature carrier component to produce a first plurality of in-phase comparison signal components and a second plurality of quadrature comparison signal components;

means for combining corresponding ones of said in-phase and quadrature comparison signal components to produce a plurality of combined comparison signal components; and said level controlling means controls the level of each of said combined comparison signal components.

13. A system in accordance with claim 12 wherein said detector means further includes a first and second plurality of low pass filter means responsive to said first and second plurality of in-phase and quadrature comparison signal components respectively and a first and second plurality of circuits for squaring the first and second plurality of filtered in-phase and quadrature signal components, respectively, before combining said corresponding ones of said in-phase and quadrature comparison signal components.

14. A pseudo-random-number code detection and tracking system comprising means for receiving a transmitted coded signal;
means for generating a local coded feedback signal;
detector means having non-linear response characteristics responsive to said coded received signal and to said local coded signal, said detector means including first and second matched filter means for comparing in parallel a plurality of time-shifted components of the in-phase component and the quadrature component, respectively, of said received signal with a plurality of time-shifted components of the in-phase component and the quadrature component, respectively, of said coded feedback signal to produce a plurality of time-shifted parallel in-phase and quadrature comparison signal components, respectively;

first and second means for serially combining said parallel time-shifted in-phase comparison signals and said parallel time-shifted quadrature comparison signals, respectively, to produce a combined serial in-phase comparison signal and a combined serial quadrature comparison signal, respectively;

first and second digital recirculating filter means responsive to said combined serial in-phase and quadrature comparison signals, respectively, to produce a filtered combined serial in-phase comparison signal and a filtered combined serial quadrature comparison signal, respectively;

first and second means for squaring said combined serial in-phase and quadrature comparison signals, respectively;

means for combining said squared combined serial in-phase and quadrature comparison signals to produce a filtered serial comparison signal;

means for multiplying said serial comparison signal by serial weight factors selected in accordance with a predetermined non-linear response characteristics of said detector means to produce a weighted serial comparison signal, and means for integrating said weighted serial comparison signal to produce said error signal.

* * * * *